(12) United States Patent
Popp

(10) Patent No.: US 9,175,138 B2
(45) Date of Patent: Nov. 3, 2015

(54) METHOD FOR PRODUCING ORGANOPOLYSILOXANES

(71) Applicant: Wacker Chemie AG, Munich (DE)

(72) Inventor: Alfred Popp, Unterhaching (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 14/413,538

(22) PCT Filed: Jul. 4, 2013

(86) PCT No.: PCT/EP2013/064154
§ 371 (c)(1),
(2) Date: Jan. 8, 2015

(87) PCT Pub. No.: WO2014/009252
PCT Pub. Date: Jan. 16, 2014

(65) Prior Publication Data
US 2015/0166732 A1    Jun. 18, 2015

(30) Foreign Application Priority Data
Jul. 10, 2012   (DE) .................. 10 2012 212 007

(51) Int. Cl.
| | | |
|---|---|---|
| C07F 7/18 | (2006.01) |
| C08G 77/06 | (2006.01) |
| C08G 77/04 | (2006.01) |
| C08G 77/08 | (2006.01) |
| C08G 77/10 | (2006.01) |
| C08G 77/50 | (2006.01) |

(52) U.S. Cl.
CPC ............. C08G 77/06 (2013.01); C08G 77/045 (2013.01); C08G 77/08 (2013.01); C08G 77/10 (2013.01); C08G 77/50 (2013.01)

(58) Field of Classification Search
USPC .......................... 556/434, 446, 452
See application file for complete search history.

(56) References Cited

U.S. PATENT DOCUMENTS

| | | | |
|---|---|---|---|
| 4,113,760 A | 9/1978 | Frey et al. |
| 6,232,423 B1 | 5/2001 | Kohler et al. |
| 2009/0156755 A1 | 6/2009 | Herzig et al. |
| 2010/0137544 A1 | 6/2010 | Herzig et al. |

FOREIGN PATENT DOCUMENTS

| | | | | |
|---|---|---|---|---|
| CA | 1095068 | * | 2/1981 | ............... C07F 7/18 |
| DE | 2630744 A1 | | 2/1978 | |
| DE | 19846397 A1 | | 4/2000 | |
| EP | 0484959 A2 | | 5/1992 | |
| EP | 2072591 A1 | | 6/2009 | |
| WO | 2007023084 A2 | | 3/2007 | |

* cited by examiner

*Primary Examiner* — Sudhakar Katakam
*Assistant Examiner* — Pancham Bakshi
(74) *Attorney, Agent, or Firm* — Brooks Kushman P.C.

(57) ABSTRACT

Organopolysiloxanes containing units of the formulae $O_{3-a/2}R_a Si—Y—(SiR_a O_{3-a/2})_b$ and $R^1_c SiO_{4-c}$ are prepared by catalyzed reaction, in a first step, of a mixture of $X_{3-a}R_a Si—Y—(SiR_a X_{3-a})_b$ and $R^1_c SiX_{4-c}$ and siloxanes which have structural units of the formulae $O_{3-a/2}R_a Si—Y—(SiR_a O_{3-a/2})_b$ and $R^1_c SiO_{4-c}$ and having weight average molar mass of 100 to 950 g/mol and reacting the mixture obtained therefrom with water or aqueous acid, producing organopolysiloxanes having a weight average molar mass of 1,000 to 100,000 g/mol, wherein R and $R^1$ each are monovalent $C_{1-30}$ SiC-bonded organic groups optionally containing one or more N and/or O atoms, Y is a 2-12 valent $C_{1-30}$ organic group optionally containing one or more O atoms, X is a hydrolyzable group, a is 0 or 1, b is 1 to 11, and c is 0, 1, 2, or 3.

9 Claims, 1 Drawing Sheet

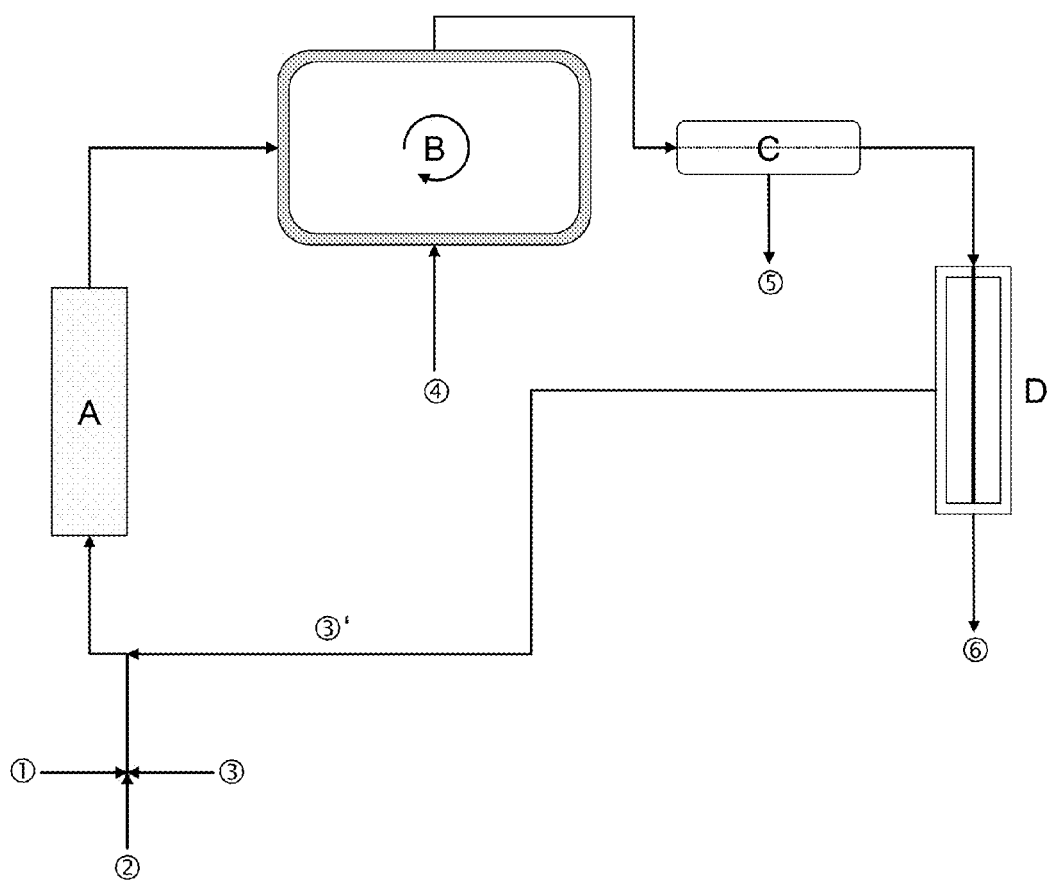

METHOD FOR PRODUCING ORGANOPOLYSILOXANES

CROSS REFERENCE TO RELATED APPLICATIONS

This application is the U.S. National Phase of PCT Appln. No. PCT/EP2013/064154 filed 4 Jul. 2013, which claims priority to German Application No. 10 2012 212 007.6 filed Jul. 10, 2012, the disclosures of which are incorporated in their entirety by reference herein.

BACKGROUND OF THE INVENTION

1. Field of the Invention

The invention relates to a method for producing organopolysiloxanes.

2. Description of the Related Art

WO 2007/023084 A2 and EP 2072 591 A1 describe organopolysiloxane compounds comprising per molecule at least one structural unit of the general formula $O_{3-a/2}R_aSi-Y-(SiR_aO_{3-a/2})_b$, such as the structural unit $O_{2/2}MeSi-CH_2CH_2-SiMeO_{2/2}$. The described method for producing these compounds is the cohydrolysis of compounds of general formulae $X_{3-a}R_aSi-Y-(SiR_aX_{3-a})_b$ and $R^1_cSiX_{4-c}$, such as the cohydrolysis of 1,2-bis(methyldichlorosilyl) ethane with vinyldimethylchlorosilane.

This method has substantial disadvantages both when carried out as a continuous operation and when carried out batchwise. Cohydrolysis with compounds of formula $R^1_cSiX_{4-c}$ forms considerable quantities of undesired by-products exclusively comprising the structural moiety $R^1_cSiO_{4-c}$ and not the desired structural moiety $O_{3-a/2}R_aSi-Y-(SiR_aO_{3-a/2})_b$. The method moreover forms low molecular weight compounds which, while also comprising the desired structural moiety $O_{3-a/2}R_aSi-Y-(SiR_aO_{3-a/2})_b$, need to be removed on account of their undesired properties (e.g. low boiling point), as is described in Example 1 of WO 2007/023084 A2. This leads to a more costly and inconvenient removal step and also to reduced yield of the target product and thus a low space-time yield.

As is apparent from DE 2630744 A1, organosiloxanes may be converted by reaction with chlorosilanes in the presence of activated carbon. Disadvantages of this method include the high temperatures, close to the boiling range of the components, and the large quantities of inorganic acids added, as is apparent from the examples.

SUMMARY OF THE INVENTION

The invention provides a method for producing organopolysiloxanes comprising per molecule at least one structural unit of general formulae $$O_{3-a/2}R_aSi-Y-(SiR_aO_{3-a/2})_b \quad \text{(I) and}$$

$$R^1_cSiO_{4-c} \quad \text{(II),}$$

characterized in that
(a) in a first step
a mixture of
compounds of general formulae $$X_{3-a}R_aSi-Y-(SiR_aX_{3-a})_b \quad \text{(III) and}$$

$$R^1_cSiX_{4-c} \quad \text{(IV)}$$

and siloxanes which comprise per molecule at least one structural unit selected from the group comprising general formulae $$O_{3-a/2}R_aSi-Y-(SiR_aO_{3-a/2})_b \quad \text{(V) and}$$

$$R^1_cSiO_{4-c} \quad \text{(VI)}$$

and mixtures thereof, and which have a molar mass ($M_w$ weight-average) of from 100 to 950 g/mol
is contacted with a catalyst, preferably a catalyst having a substantially acidic surface, and
(b) in a second step
the mixture obtained therefrom is reacted with water or an aqueous acid
to obtain organopolysiloxanes which comprise per molecule at least one structural unit of formulae (I) and (II), and which have a molar mass ($M_w$ weight-average) of from 1000 to 100,000 g/mol
where
R may be identical or different and represent monovalent SiC-bonded organic radicals which comprise from 1 to 30 carbon atoms and which may comprise one or more nitrogen and/or oxygen atoms,
$R^1$ may be identical or different and represent monovalent SiC-bonded organic radicals which comprises from 1 to 30 carbon atoms and which may comprise one or more nitrogen and/or oxygen atoms,
Y represents a divalent to dodecavalent organic radical which comprises from 1 to 30 carbon atoms and which may comprise one or more oxygen atoms,
X represents a hydrolyzable group,
a is 0 or 1,
b is an integer of from 1 to 11 and
c is 0, 1, 2 or 3.

BRIEF DESCRIPTION OF THE DRAWINGS

FIG. 1 represents in schematic form, one apparatus suitable for use in the process of the invention.

DETAILED DESCRIPTION OF THE PREFERRED EMBODIMENTS

It was found that, surprisingly, in the presence of a catalyst, low molecular weight siloxanes comprising per molecule at least one structural unit of formula (V) or (VI), as generated in the removal step described in WO 2007/023084 A2 for example, react again with compounds of general formulae (III) and (IV) and in turn, following subsequent hydrolysis, give organopolysiloxanes comprising per molecule at least one structural unit of general formula (I) and (II).

Examples of R are hydrocarbon radicals such as saturated or unsaturated hydrocarbon radicals which may comprise aromatic or aliphatic double bonds. Examples of hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl and 2-ethylhexyl radicals, nonyl radicals such as the n-nonyl radical, decyl radicals, such as the n-decyl radical, dodecyl radicals such as the n-dodecyl radical, tetradecyl radicals such as the n-tetradecyl radical, hexadecyl radicals such as the n-hexadecyl radical and octadecyl radicals such as the n-octadecyl radical; cycloalkyl radicals such as the cyclopentyl, cyclohexyl and 4-ethylcyclohexyl, cycloheptyl radicals, norbornyl radicals and methylcyclohexyl radicals; aryl radicals such as the phenyl, biphenyl, naphthyl, anthryl and phenanthryl radicals; alkaryl radicals, such as the o-, m- and p-tolyl radicals, xylyl radicals and ethylphenyl radicals; aralkyl radicals such as the benzyl radical; alkenyl radicals, such as the 7-octenyl, 5-hexenyl, 3-butenyl, allyl and vinyl radicals, and also the alpha- and beta-phenylethyl radicals.

The hydrocarbon radicals R may comprise ether or polyether groups, amino or polyamino groups, such as primary, secondary or tertiary amino groups.

R is preferably a monovalent hydrocarbon radical comprising from 1 to 18 carbon atoms. R is preferably a methyl, ethyl or phenyl radical, methyl being particularly preferred.

Examples of R radicals also apply to $R^1$ radicals. $R^1$ is preferably a monovalent hydrocarbon radical comprising from 1 to 18 carbon atoms. $R^1$ is preferably a methyl, ethyl, phenyl, allyl or vinyl group, methyl and vinyl being particularly preferred.

a is preferably 1.
b is preferably 1.
c is preferably 2 or 3.

Examples of units of formula (II) are units of formula $R^1_3SiO_{1/2}$, such as the vinyldimethylsiloxane unit or the trimethylsiloxane unit, and units of formula $R^1_2SiO$, such as the dimethylsiloxane unit or the vinylmethylsiloxane unit.

The molar ratio of structural element (II) to structural element (I) is at least 1 and preferably at least 2.

It is preferable when the ratio of the number of carbon atoms in Y to the valence of Y is no more than 10, preferably no more than 5 and more preferably no more than 3.

Y is preferably a linking organic unit comprising from 1 to 24 carbon atoms between from two to twelve siloxanyl units (Si atoms).

Y is preferably divalent, trivalent or tetravalent, more preferably divalent.

It is preferable when Y is a divalent, trivalent or tetravalent hydrocarbon radical comprising from 1 to 24 carbon atoms, preferably from 2 to 12 carbon atoms. Y is preferably a divalent hydrocarbon radical comprising from 2 to 12 carbon atoms.

Examples of Y are methylene and methine groups, tetravalent carbon, the 1,1-ethanediyl and 1,2-ethanediyl groups and the 1,4-butanediyl and 1,3-butanediyl groups.

When Y comprises at least 2 carbon atoms, this radical may also be unsaturated. Examples are the —CH=CH— group (cis or trans), the >C=CH$_2$— group and the —C≡C— group. It is particularly preferable when Y is a hydrocarbon radical comprising 2 carbon atoms. Examples of particularly preferred radicals are —CH$_2$CH$_2$—, —CH(CH$_3$)—, —CH=CH—, —C(=CH$_2$)— and —C≡C—.

One example of a compound of formula (III) is 1,2-bis (methyldichlorosilyl)ethane which is produced by a hydrosilylation reaction by addition of hydrogenmethyldichlorosilane to vinylmethyldichlorosilane. X is preferably a halogen, acid or alkoxy group; X is more preferably a chlorine, acetate, formate, methoxy or ethoxy group.

The molecular weight of the compounds of general formulae (V) and (VI) employed is thus naturally lower than that of the organopolysiloxane produced which comprises per molecule at least one structural unit of general formulae (I) and (II).

The compounds of general formulae (V) and (VI) employed preferably have a molar weight of from 160 to 800 g/mol ($M_w$ weight-average).

The organopolysiloxane products, comprising per molecule at least one structural unit of general formulae (I) and (II), preferably have a molar weight of from 1500 to 10,000 g/mol ($M_w$ weight-average).

The method according to the invention may be carried out either as a continuous operation or batchwise.

It is preferable to carry out the method as a continuous operation.

The mixing of components III and IV and the siloxanes comprising the structural units V and/or VI may be carried out by any method known to those skilled in the art. Examples include mixer stirrer units in case of batchwise operation and static mixers in case of continuous operation.

The siloxanes, comprising the structural units V and/or VI, may be compounds produced specifically. However, it is also possible to employ the volatile compounds which have been removed from the crude product by suitable measures.

The siloxanes are preferably low molecular weight by-products which are formed in addition to the organopolysiloxanes comprising the structural units (I) and (II), removed from the organopolysiloxanes comprising the structural units (I) and (II), preferably thermally, such as by distillation, and recycled into the method.

It is preferable when the siloxane comprising the structural unit (VI) employed is a siloxane of formula $R^1_3SiOSiR^1_3$ (where $R^1$ is as defined above), 1,3-divinyl-1,1,3,3-tetramethyldisiloxane being preferred.

The molar ratio of component III to component IV, and accordingly of structural unit V to structural unit VI, employed in the mixture may be adjusted according to the desired properties of the end product by those skilled in the art.

The molar fraction w of component III in the mixture may thus be selected from the range 0%<w≤50%, preferably 1%≤w≤20%.

The molar fraction x of component IV in the mixture may thus be selected from the range 1%≤x≤90%, preferably 20%≤x≤60%.

The molar fraction y of structural unit V in the mixture may thus be selected from the range 0%≤y≤50%, preferably 1%≤y≤20%.

The molar fraction z of structural unit VI in the mixture may thus be selected from the range 1%≤z≤90%, preferably range 20%≤z≤60%.

For the molar fractions: w+y>0.

These molar fractions w, x, y and z are chosen such that the sum of w+x+y+z is 100%.

The step of contacting with a catalyst in the first method step (a) may be effected by any manner known to those skilled in the art.

This may be effected either batchwise or as a continuous operation. The mixture of the components III and IV and the siloxanes comprising the structural units V and/or VI may be stirred or shaken together with the catalyst in order to ensure particularly good dispersion of the constituents of such a mixture.

One particularly preferred embodiment of the method according to the invention is continuous contacting by passing the mixture through a vessel packed with the catalyst (preferably a reaction column packed with the catalyst).

The catalyst may be selected, for example, from the group comprising activated carbon, activated coke, silicates, aluminosilicates, heteropolyacids, sulfated zirconia and polysulfonic acids but is not limited to these material classes. Preferred among these are activated carbon, zeolite-type aluminosilicates and Tonsil-type phyllosilicates. Activated carbon is particularly preferred.

This activated carbon is an industrially produced carbonaceous product which is easy to handle and has a porous structure and a large internal surface area. The pore volume is preferably from 0.17 to 5 ml/g, more preferably from 0.2 to 3 ml/g, the internal surface area is preferably from 300 to 3000 m$^2$/g, preferably from 400 to 2000 m$^2$/g, and the pore size preferably ranges from 0.3 to 4000 nm, more preferably from 0.4 to 200 nm.

It is possible to use carbon powder (more than 90% of particles below 0.18 mm), granulocarbon (more than 90% of particles above 0.18 mm) and moulded carbon (activated carbon cylinders of identical diameter and varying length). The activated carbon may be activated either with steam or chemically (e.g. with zinc chloride or phosphoric acid).

The amount of the activated carbon used as catalyst is preferably from 0.001 to 30 wt %, in particular from 0.01 to 1 wt %, in each case based on the total weight of the mixture to be reacted composed of the components III and IV and the siloxanes comprising the structural units V and/or VI.

If desired, the method according to the invention may also be carried out in the presence of a solvent inert toward the reaction participants. Examples of such solvents are hydrocarbons and halohydrocarbons liquid at room temperature (1013 mbar), such as benzene, toluene, xylene, methylene chloride, and petroleum ether. It is preferable when no additional solvent is used.

It is preferable when the first step of the method according to the invention is carried out at the pressure p of the surrounding atmosphere, i.e., at p=1013 mbar. However, if desired or necessary, the method according to the invention may also be carried out at relatively high pressures, for example 1013 mbar≤p≤5000 mbar, which may even develop due to pressure buildup in a reaction column for example, or at relatively low pressures, for example 0.1 mbar≤p≤1013 mbar, which may be desirable to maintain a comparatively low temperature.

The first step of the method according to the invention is preferably carried out at temperatures of from 20° C. to 200° C., more preferably from 40° C. to 160° C., and most more preferably from 50° C. to 120° C.

The contact duration T in this first method step may be selected from the range of 1 second≤T≤24 h. The contact duration T is preferably in the range 10 seconds≤T≤120 minutes, more preferably in the range 60 seconds≤T≤60 minutes.

If desired or necessary, an inorganic acid may be used in the reaction. Examples of such inorganic acids are hydrogen chloride, sulfuric acid and phosphoric acid. Anhydrous hydrogen chloride is preferred. The hydrogen chloride may be generated in situ by small amounts, for example from 0.00001 to 1 wt % based on the weight of the components to be transformed, of water mixed with the components or adsorbed on the activated carbon by reaction of this water with compounds of general formula III or IV. However, it is also possible to pass hydrogen chloride through the mixture of the reaction participants or to add it thereto.

The removal of the activated carbon may be effected by any method known to those skilled in the art, for example by filtration. It is preferable to effect the treatment with activated carbon as a continuous operation in a reaction column packed with activated carbon, so that a separate removal step is unnecessary.

The contacting of the reaction mixture with water or an aqueous acid in the second method step (b) (hydrolysis) may be effected in any manner known to those skilled in the art. This may be effected either batchwise or as a continuous operation. The mixture from the activated carbon treatment may be stirred or shaken together with water or an aqueous acid in order to ensure particularly good dispersion of the constituents of such a mixture.

One particularly preferred embodiment of the method according to the invention is the continuous contacting by passing the hydrolysis mixture through a reaction tube which may optionally also comprise static mixers.

It is particularly preferable for the hydrolysis mixture to be contacted with water or an aqueous acid in a loop reactor in which case the mixing may optionally be further improved using static mixers.

The ratio of hydrolysis mixture to water or an aqueous acid may be specifically selected by those skilled in the art having regard to the desired properties of the end product. The molar amount of this water or the molar amount of water present in this aqueous acid needs to be sufficient to react with all of the hydrolyzable groups X present in the hydrolysis mixture. Useful aqueous acids include all solutions of organic or inorganic acids in water. It is particularly preferable when the aqueous acid is selected from solutions of hydrogen chloride or sulfuric acid in water.

The ratio of hydrolysis mixture to water or an aqueous acid is also used to adjust the concentration of the acid in the aqueous phase after reaction has been effected. This concentration of the acid is preferably in the range between 1% and more 40%, more preferably in the range between 5% and 25%.

If desired, the second step (b) of the method according to the invention may also be carried out in the presence of a solvent inert toward the reaction participants. Examples of such solvents are hydrocarbons and halohydrocarbons liquid at room temperature (1013 mbar), such as benzene, toluene, xylene, methylene chloride, petroleum ether. It is preferable when no additional solvent is used.

The second step (b) of the method according to the invention is preferably carried out at the pressure p' of the surrounding atmosphere, i.e., at p'=1013 mbar. However, if desired or necessary the subsidiary step b of the method according to the invention may also be carried out at relatively high pressures, for example 1013 mbar≤p'5000 mbar, which may even develop due to pressure buildup in a loop reactor for example, or at relatively low pressures, for example 0.1 mbar≤p'≤1013 mbar, which may be desirable to maintain a comparatively low temperature.

The second step (b) of the method according to the invention is preferably carried out at temperatures of from 20° C. to 200° C., in particular at 20-100° C. It is particularly preferable when the reaction temperature is in the range of from 40-80° C.

In this second method step (b), the residence time T' in the reaction vessel may be selected from the range 1 second≤T'≤24 h. The residence time T' is preferably in the range 10 seconds≤T'≤120 minutes, more preferably in the range 60 seconds≤T'≤60 minutes.

The hydrolyzable group X liberated in the hydrolysis may be removed in the protonated form HX. It is generated in either directly in gaseous form or dissolved in an excess of water.

Removal may be effected in any manner known to those skilled in the art. Removal in dissolved form in water is preferred. It is particularly preferable when the removal of the aqueous phase from the siloxane phase is effected by simple phase separation which may optionally be improved using coalescers.

The aqueous acid removed from the siloxane phase (HX in water) may subsequently be recycled back into the hydrolysis, i.e., into the second method step (b).

Undesired compounds formed in the reaction may be removed as necessary by any method known to those skilled in the art. For example, low molecular weight compounds may be easily removed by thermal separation. Thermal separation may be effected as a continuous operation or batchwise. This separation is preferably effected as a continuous operation. It is particularly preferable when the continuous removal is effected using a short-path or thin-film evaporator. The necessary separation conditions (temperature, pressure, residence time) depend on the properties of the desired target product. If the removed compounds comprise siloxanes comprising per molecule at least one structural unit of general formulae V and/or VI, these may be used as raw material for the mixture in the first method step (a).

EXAMPLE

The plant for producing the organopolysiloxane according to the invention consists of four parts as per FIG. 1:

A Glass cylinder (V=900 cm³) having a double wall and packed with 500 g of activated carbon. The outer wall is thermostated to 80° C. using an oil thermostat.

B Loop reactor (V=1.4 L), thermostated to <50° C. using an external cooling means and equipped with a circulation pump (800 L/h) which circulates the contents. The reaction mixture from A and water ④ are dosed separately using pumps. The biphasic hydrolysis mixture is drawn off via an overflow.

C Coalescer equipped with glass wool mats to improve phase separation; the siloxane top phase is passed to the thin film evaporator D, the acidic aqueous phase ⑤ is removed.

D Thin film evaporator (evaporator surface area about 0.2 m², surface temperature=140° C., pressure=10 mbar, dosing about 0.7 L/h) having a product outlet and an outlet for the low-boiling polysiloxanes ③'

As per FIG. 1, ① (dimethylvinylchlorosilane), ② (a mixture of 1,2-bis(dichloromethylsilyl)ethane and 1,2-bis(dichloromethylsilyl)ethene in a molar ratio of 5 to 1) and ③ (1,3-divinyl-1,1,3,3-tetramethyldisiloxane) are mixed in a mass ratio of 2.3:1.0:4.2. As soon as distillate ③' from D is available, ③' is replaced therewith.

Distillate ③' consists of a mixture of siloxanes 1, which comprise structural units of formulae V and VI, and siloxane 2 composed of structural units of formula VI in a molar ratio of siloxane 1:siloxane 2=10%:90%.

For siloxanes 1: Y=—CH$_2$CH$_2$— & —CH=CH— (in a ratio of 5:1), a=1, b=1, c=3, R=—CH$_3$, R$^1$=—CH$_3$ & —CH=CH$_2$ (in a ratio of 2:1).

For siloxane 2: [CH$_2$=CH—Si(CH$_3$)$_2$]$_2$O=1,3-divinyl-1,1,3,3-tetramethyldisiloxane.

Siloxanes 1 have molar masses M$_w$ (weight-average) of from 330 g/mol to 518 g/mol and siloxane 2 has a molar mass M$_w$ of 186 g/mol.

The mixture is pumped through the carbon column A at a rate of 1 L/h. The reaction mixture obtained therefrom is dosed directly into loop reactor B. Water is simultaneously co-dosed into the reactor at a rate of 1.2 L/h.

The biphasic reaction mixture is passed from the loop reactor into a coalescer C via the overflow and the aqueous phase is removed.

The crude siloxane is subsequently freed of the volatile constituents in thin film evaporator D, the volatile constituents being reused to produce the starting mixture.

The obtained polymer ⑥ has the following properties
Viscosity=66 mm²/s at 25° C.
Iodine value=141
OH content=0.8%
Molar mass M$_w$=1500 g/mol
(weight-average)

Comparative Experiment

A mixture of 256 g of 1,2-bis(methyldichlorosilyl)ethane and 578.4 g of vinyldimethylchlorosilane is metered into 1400 g of water in a 4 L three-necked flask equipped with a KPG stirrer, cooler, thermometer and 1 L dropping funnel with stirring such that the temperature of the reaction mixture does not exceed 36° C. The mixture is then stirred vigorously for 60 minutes and the phases are subsequently separated over 20 minutes. The siloxane phase is washed twice with 1500 g of water in each case and 580 g of the crude product are obtained.

Volatile hydrolysis products are removed in a rotary evaporator under reduced pressure (10 mbar) at a bath temperature of up to 140° C. The distillate (270 g=47% of the crude product) consisting of a mixture of 1,3-divinyl-1,1,3,3-tetramethyldisiloxane and lower polymers comprising structural units of general formula V (in a ratio of 90:10) is discarded. 310 g of a clear liquid are obtained as pure product.
Viscosity=20 mm²/s at 25° C.
Iodine value=160
OH content=0.1%

The invention claimed is:
1. A method for producing organopolysiloxanes comprising per molecule at least one structural unit of formulae

  (I) and

  (II), comprising:
(a) in a first step,
contacting a mixture of
compounds of formulae

  (III) and

  (IV), and siloxanes which comprise per molecule at least one structural unit of the formulae

  (V) and

  (VI)

and mixtures thereof and which have a molar mass (M$_w$ weight-average) of from 100 to 950 g/mol
with a catalyst, wherein the catalyst is an activated carbon, and
(b) in a second step
the mixture obtained therefrom is reacted with water or an aqueous acid,
to obtain organopolysiloxanes which comprise per molecule at least one structural unit of formulae (I) and (II), and having a molar mass (M$_w$ weight-average) of from 1000 to 100,000 g/mol,
where
R are identical or different and represent a monovalent SiC-bonded organic radical which comprises from 1 to 30 carbon atoms and optionally contains one or more nitrogen and/or oxygen atoms,
R$^1$ are identical or different and represent a monovalent SiC-bonded organic radical which comprises from 1 to 30 carbon atoms and which optionally contains one or more nitrogen and/or oxygen atoms,
Y are divalent to dodecavalent organic radicals which comprise from 1 to 30 carbon atoms and which optionally contain one or more oxygen atoms,
X is a hydrolyzable group,
a is 0 or 1,
b is an integer of from 1 to 11 and
c is 0, 1, 2 or 3,
with the proviso that the siloxanes employed which comprise per molecule at least one structural unit of formulae (V) and (VI) and mixtures thereof are by-products which are formed in addition to the organopolysiloxanes comprising the structural units (I) and (II), have been removed from the organopolysiloxanes comprising the structural units (I) and (II), and recycled into the method.

2. The method of claim 1, wherein b is 1 and Y is a divalent hydrocarbon radical comprising from 2 to 12 carbon atoms.

3. The method of claim 1, wherein 1,3-divinyl-1,1,3,3-tetramethyldisiloxane is employed as a siloxane comprising structural units of formula (VI).

4. The method of claim 2, wherein 1,3-divinyl-1,1,3,3-tetramethyldisiloxane is employed as a siloxane comprising structural units of formula (VI).

5. The method of claim 1, wherein X is a halogen, acid or alkoxy radical.

6. The method of claim 2, wherein X is a halogen, acid or alkoxy radical.

7. The method of claim 1, wherein the method is carried out as a continuous operation.

8. The method of claim 1, wherein the method step (a) is carried out as a continuous operation in a reaction column packed with activated carbon.

9. The method of claim 1, wherein the method step (b) is carried out as a continuous operation in a loop reactor.

\* \* \* \* \*